United States Patent
Cho et al.

(10) Patent No.: US 10,382,863 B2
(45) Date of Patent: Aug. 13, 2019

(54) LIGHTING INTEGRATED SOUND PROCESSING

(71) Applicant: Eaton Intelligent Power Limited, Dublin (IE)

(72) Inventors: Nam Chin Cho, Peachtree City, GA (US); Parth Joshi, Sugar Hill, GA (US); Brad Edward Paine, Fayetteville, GA (US); Kenneth Dale Walma, Jr., Peachtree City, GA (US); William T. Cook, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/051,333

(22) Filed: Jul. 31, 2018

(65) Prior Publication Data
US 2019/0045300 A1 Feb. 7, 2019

Related U.S. Application Data

(60) Provisional application No. 62/539,978, filed on Aug. 1, 2017.

(51) Int. Cl.
*H04R 3/00* (2006.01)
*G10L 15/22* (2006.01)
*F21K 9/20* (2016.01)
*G10K 11/175* (2006.01)
(Continued)

(52) U.S. Cl.
CPC ............... *H04R 3/005* (2013.01); *F21K 9/20* (2016.08); *F21V 33/0056* (2013.01);
(Continued)

(58) Field of Classification Search
CPC . H04R 3/00; H04R 3/005; H04R 3/12; H04R 2420/07; H04R 2227/005;
(Continued)

(56) References Cited

U.S. PATENT DOCUMENTS 9,462,663 B2   10/2016   Aggarwal et al.
9,504,132 B2   11/2016   Aggarwal et al.
(Continued)

FOREIGN PATENT DOCUMENTS

EP   0653701   8/2000
EP   2430632   9/2015
(Continued)

OTHER PUBLICATIONS https://www.legitreviews.com/sengled-snap-led-light-bulb-integrated-ip-camera-speaker-microphone_156203 Published Jan. 4, 2015 (about mic and speaker integrated led bulb); Jan. 4, 2015.
(Continued)

*Primary Examiner* — Thang V Tran
(74) *Attorney, Agent, or Firm* — King & Spalding LLP (57) ABSTRACT

A lighting system includes a first lighting fixture that includes a first microphone and a first transmitter. The first transmitter is configured to transmit a first digital audio stream generated based on a sound. The lighting system further includes a second lighting fixture that includes a second microphone and a second transmitter. The second transmitter is configured to transmit a second digital audio stream generated based on the sound, where the sound is received by the first microphone and by the second microphone. The lighting system also includes a central processor that can process the first digital audio stream and the second digital audio stream to identify the sound.

18 Claims, 6 Drawing Sheets

(51) Int. Cl.
*H04R 1/22* (2006.01)
*F21V 33/00* (2006.01)
*G06F 3/16* (2006.01)
*G10L 25/51* (2013.01)

(52) U.S. Cl.
CPC .............. *G06F 3/165* (2013.01); *G06F 3/167* (2013.01); *G10K 11/175* (2013.01); *G10L 15/22* (2013.01); *H04R 1/222* (2013.01); *G10L 25/51* (2013.01)

(58) Field of Classification Search
CPC ......... G10L 15/02; G10L 15/08; G10L 15/22; G10L 15/223; G10L 15/265; G10L 25/51; G10L 25/78; G10L 25/84; G10L 2021/02166; G10L 21/028; G06F 3/165; G06F 3/167; F21K 9/20; F21V 33/0052; F21V 33/0056

See application file for complete search history.

(56) References Cited

U.S. PATENT DOCUMENTS 10,278,261 B2   4/2019  Aggarwal et al.

| | | | | |
|---|---|---|---|---|
| 2014/0254829 A1* | 9/2014 | Wang | ....................... | H04R 3/12 381/105 |
| 2015/0026580 A1* | 1/2015 | Kang | ...................... | G06F 3/167 715/728 |
| 2015/0032812 A1* | 1/2015 | Dudley | ............ | H04N 21/42203 709/204 |
| 2015/0163881 A1* | 6/2015 | Pederson | ........... | H05B 33/0863 315/154 |
| 2016/0014490 A1* | 1/2016 | Bar Bracha | ............ | H04R 3/005 381/92 |
| 2017/0332168 A1* | 11/2017 | Moghimi | ............... | H04R 3/005 |
| 2018/0177029 A1* | 6/2018 | Wang | ................. | H05B 37/0236 |
| 2018/0317303 A1* | 11/2018 | Cairns | ................. | H05B 37/0272 |
| 2018/0350363 A1* | 12/2018 | Cook | ..................... | H04R 1/028 |

FOREIGN PATENT DOCUMENTS

JP    2006139107    6/2006
KR   20170054963    5/2017

OTHER PUBLICATIONS

C by G. https://www.gelighting.com/led-bulbs/product-family-c-by-ge.Pages_1-9 Mar. 5, 2019.

* cited by examiner

LIGHTING INTEGRATED SOUND PROCESSING

RELATED APPLICATIONS

The present application claims priority to U.S. Provisional Patent Application No. 62/539,978, filed Aug. 1, 2017, and titled "Lighting Integrated Sound Processing," the entire content of which is incorporated herein by reference.

TECHNICAL FIELD

The present disclosure relates generally to lighting-related solutions, and more particularly to integrated lighting and sound devices, systems and operations.

BACKGROUND

Different sounds may be produced by different actions and activities. For example, the sound of footsteps may be a result from a person walking in an area, and a breaking glass sound may be produced when a window breaks. Different devices and appliances may also produce different sounds. For example, a doorbell may produce a particular alert sound, a smoke detector may produce a particular alarm sound, an oven timer may produce a particular alert sound when cooking time is finished, and a toaster may produce a particular commonly recognizable sound when the toasting is complete. Some devices may also receive voice commands that result in useful actions such as controlling lights and appliances, and providing answers to common questions. These devices are generally standalone devices that have to be located reasonably close to the person giving the command. Positioning a voice-based device for reliable operation may sometimes be challenging and/or inconvenient. Reliably recognizing a particular sound or a voice command in a noisy environment (e.g., during a party) by a standalone device may also be challenging. Thus, a solution that enables more reliable sound-based operations is desirable.

SUMMARY

The present disclosure relates generally to lighting-related solutions, and more particularly to integrated lighting and sound devices, systems, and methods of operation. In an example embodiment, a lighting system includes a first lighting fixture that includes a first microphone and a first transmitter. The first transmitter is configured to transmit a first digital audio stream generated based on a sound. The lighting system further includes a second lighting fixture that includes a second microphone and a second transmitter. The second transmitter is configured to transmit a second digital audio stream generated based on the sound, where the sound is received by the first microphone and by the second microphone. The lighting system also includes a central processor that can process the first digital audio stream and the second digital audio stream to identify the sound.

In another example embodiment, a method of sound-based operation of a lighting system includes receiving, by multiple lighting fixtures, a sound, and transmitting, by the multiple lighting fixtures, digital audio streams that each contain an audio content corresponding to the sound. The method further includes identifying, by a central processor, the sound by processing the digital audio streams.

In another example embodiment, a method of sound processing in a lighting system includes receiving, by a first lighting fixture, a voice command and transmitting, by the first lighting fixture, a digital audio stream that contains an audio content corresponding to the voice command. The method further includes identifying, by a central processor, the voice command by processing the digital audio stream and transmitting, by the central processor, to a second lighting fixture a response to the voice command.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures may designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Some products enable use of user voice commands that result in useful actions such as controlling lights and appliances, and providing information to common questions. These devices (e.g., Amazon Echo, Google Home, and other similar products such as those that utilize Amazon's and Google's voice services) are standalone products that work independently of each other and are limited in capabilities. In order to accomplish more complex tasks and to perform some tasks more widely and/or more reliably, a platform of products that are located throughout a user's space and that share a collection of sounds including voice commands may be used. For example, a platform of multiple lighting fixtures with integrated audio processing capabilities that are distributed throughout a home can enable features that are performed more reliably and that are broadly available. When the collection of sounds are time-stamped and then processed in real-time, resulting features and actions can be greatly enhanced. Such features include triangulation (3D mapping/local positioning system) and detection of particular sounds such as glass break, smoke (via smoke detector sound), doorbell, water leak detection, location specific voice commands, toaster oven, etc. and responses or action (e.g., at one or more other light fixtures or other remotely located devices) to such detections as well as noise cancellation, voice recognition enhancement, coordinated response between fixtures or other devices, etc.

In some example embodiments, a connected system of light fixtures installed throughout the user's space may include integrated audio sensors (e.g., a microphone or microphone array), embedded processing circuitry, a speaker(s), and a wireless transceiver(s). Each lighting fixture is capable of detecting and compressing sounds including voices and then streaming the compressed data to a local server, a gateway device, edge-computing device(s), or to the cloud for post-processing. Post-processing involves decompression and splitting of each incoming audio stream followed by comparing each audio stream's waveform amplitude, duration, and frequency components to an existing collection of known waveforms or against other audio streams collected contemporaneously from nearby devices. When a match is found, the system can trigger an action such as, for example, a text message notification to the user of the event such as location of a detected glass break. As another example, when a threshold associated with an audio characteristic is met or when filtering of the audio stream indicates a particular sound, the system can trigger an action such as, for example, a text message notification to the user of the event such as location of a detected glass break. Having multiple audio sensors allows the system to determine a more accurate location of the source, for example, by way of sound wave triangulation. Also, it allows a user to provide the same voice command throughout the user space that results in actions specific to that location or a remote location.

In some example embodiments, the system's embedded audio sensors and speakers can be used to provide real-time noise cancellation to remove ambient noise. In some example embodiments, the system may perform voice identification where the system can distinguish a user's identity, for example, based on the user's voice, and may then perform actions specific to that user. With such capabilities, the system can, for example, automatically lock/unlock doors, or provide access to electronic devices such as computers by tracking the person's location and voice in real-time. In some example embodiments, the system's audio sensors embedded in multiple light fixtures can be used to provide multiple audio steams for filtering and/or processing the audio streams from the multiple light fixtures (or other listening devices) to filter out background noise for better sound or audio command detection and interpretation.

Figure 1:
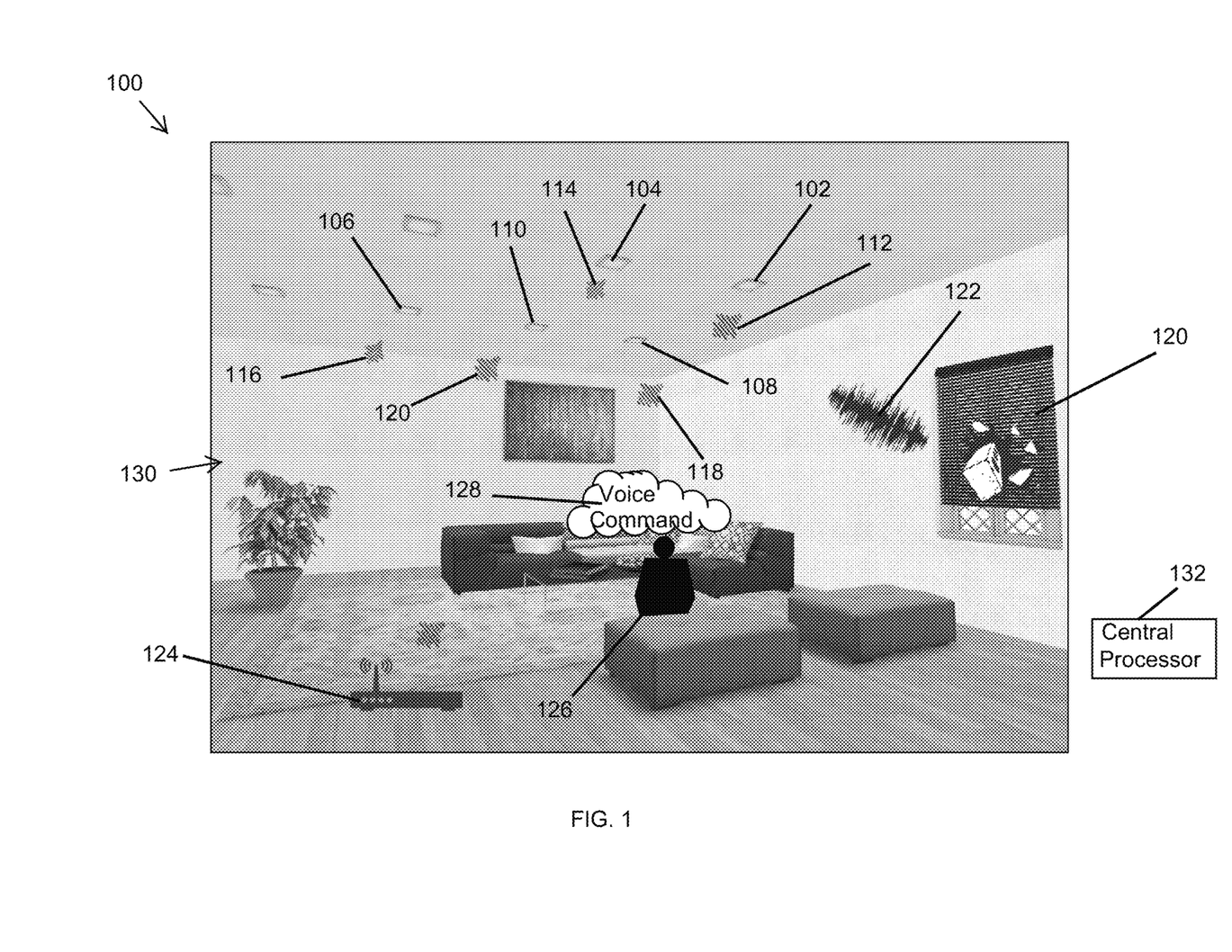
FIG. 1 illustrates a lighting and sound system including multiple lighting devices according to an example embodiment.

Turning now to the figures, example embodiments are described. FIG. 1 illustrates a lighting and sound system 100 including multiple lighting devices according to an example embodiment. In some example embodiments, the system 100 includes lighting fixtures 102-110. The system 100 may also include a local gateway device 124 that can wirelessly or via wired connections (e.g., Ethernet connections) receive signals from the lighting fixtures 102-110. For example, the lighting fixture 102 may transmit wireless signals 112, the lighting fixture 104 may transmit wireless signals 114, the lighting fixture 106 may transmit wireless signals 116, the lighting fixture 108 may transmit wireless signals 118, and the lighting fixture 110 may transmit wireless signals 120. The lighting fixtures 102-110 may transmit the wireless signals in compliance with a wireless communication standard such as Wi-Fi, ZigBee, Bluetooth low energy (BLE), or another wireless standard or protocol. For example, the lighting fixtures 102-110 may transmit the wireless signals in compliance with a proprietary communication protocol.

In some example embodiments, the lighting fixtures 102-110 may receive voice commands or other sounds that emanated from within the room 130 and/or voice commands or other sounds that enter the room 130. For example, each lighting fixture 102-110 may include a microphone that can receive a sound. Each lighting fixture 102-110 that receives a particular sound may transmit a wireless signal containing a representation (e.g., a digital representation) of the sound to a central processing device 132 (e.g., a local server or a cloud server) via the gateway device 124. Alternatively, one or more of the lighting fixtures 102-110 that receive a particular sound may transmit an electrical signal containing a representation of the sound 122 to the gateway device 124 via a wired connection for transmission to the central processing device 132. The central processing device 132 may be a cloud-based server, a local server, a gateway device, or an edge computing device, or multiple, distributed processing devices.

As an illustrative example, a breaking-glass sound 122 that is produced when a window 120 of the room 130 breaks may reach one or more of the lighting fixtures 102-110. Each lighting fixture 102-110 that receives the breaking-glass sound 122 may record the sound 122, for example, in a memory device of the particular lighting fixture 102-110. To illustrate, each lighting fixture 102-110 may record the digital audio sound 122 in a digital audio format. Along with recording the sound 122, each lighting fixture 102-110 that receives the breaking-glass sound 122 may also record respective time of arrival information corresponding to or indicative of the time that the sound 122 is received at the particular lighting fixture 102-110.

Each lighting fixture 102-110 may also record the amplitude (e.g., decibel level) of the sound. Each lighting fixture 102-110 may wirelessly or via a wired connection transmit the recorded sound along with the time of arrival information, for example, as a digital audio stream. In some alternative embodiments, the lighting fixture 102-110 may generate and transmit the digital audio steams to the central processing device 132 without first recording the generated digital audio streams. When present, the gateway device 124 may receive the respective digital audio stream from each lighting fixture 102-110 that received and recorded the sound 122 and transmit the digital audio streams to the central processing device 132. In some example embodiments, each one of the lighting fixtures 102-110 may also transmit other information, such as amplitude information, to the central processing device 132.

In some example embodiments, when the central processing device 132 receives audio streams from two or more of the lighting fixtures 102-110, the central processing device 132 can process the multiple digital audio streams to identify the breaking-glass sound 122. For example, the central processing device 132 may compare the digital audio streams against known sounds (e.g., waveforms of breaking-glass, a smoke alarm, a doorbell, etc.) to identify the sound represented by each digital audio stream. The central processing device 132 may also compare the contents of the multiple digital audio streams to each other to more reliably identify the sound 122 before or after processing each digital audio stream to identify the sound 122. As another example, the central processing device 132 may identify the sound 122 based on each digital audio stream and compare the results to make a more reliable identification of the sound 122. In general, the digital audio streams from two or more of the lighting fixtures 102-110 enable a more reliable identification of a sound received by the two or more of the lighting fixtures 102-110.

In some example embodiments, the lighting fixtures 102-110 may receive the sound 122 at different times, for example, because of different distances from the window 120. For example, the lighting fixture 102 may receive the sound 122 before the other lighting fixtures 104-110 receive the sound 122, and the lighting fixture 108 may receive the sound 122 before the other lighting fixtures 104, 106, and 110 receive the sound 122. The times of arrival recorded along with the sound 122 by the lighting fixtures 102-110 indicate the different times at which the sound 122 reached the lighting fixtures 102-110 and may be indicative of the proximity of each lighting fixture 102-110 to the source of the sound 122.

In some example embodiments, the location of each lighting fixture 102-110 may be transmitted to the central processing device 132 by the respective lighting fixture 102-110 or may otherwise be provided to the central processing device 132. For example, each lighting fixture 102-110 may transmit its own location to the central processing device 132, for example, once or periodically. To illustrate, location coordinates of each lighting fixture 102-110 with respect to a particular reference location may be provided to the central processing device 132. The reference location may correspond to a corner of a house, a corner of a room, etc. The central processing device 132 can use the location information of each lighting fixture 102-110 along with time of arrival information included in the digital audio streams to determine or estimate the source of the sound 122 and/or the location of the source of the sound 122.

For example, the central processing device 132 may determine that the glass-break sound emanated near the lighting fixture 102 by processing the digital audio streams from the lighting fixtures 102-110. As another example, using the location and time of arrival information, the central processing device 132 may determine that a particular sound emanated from a source that is between two of the lighting fixtures 102-110. In an alternative embodiment, the amplitude (e.g., decibel level) of the sound received by different light fixtures may be used in addition to (or instead of) the location and time of arrival information to provide an indication (e.g., the potential basis for triangulation) of the proximity of each light fixture to the source of the sound.

In some example embodiments, a voice command 128 from a person 126 may also reach one or more of the lighting fixtures 102-110. Each lighting fixture 102-110 that receives the voice command 128 may record the voice command in a digital format along with time of arrival information corresponding to or indicative of the time that the voice command 128 is received at the particular lighting fixture 102-110. Each lighting fixture 102-110 that receives and records the voice command 128 may wirelessly or via a wired connection transmit the recorded sound along with the time of arrival information, for example, as a digital audio stream. The gateway device 124 may receive the digital audio stream from each of the lighting fixtures 102-110 that received and recorded the voice command 128 and may transmit the digital audio streams to the central processing device 132.

In some example embodiments, the central processing device 132 may process the digital audio streams generated based on the voice command 128 in a similar manner as described with respect to the sound 122. For example, the central processing device 132 may identify the voice command 128 as "turn on light," "turn on oven," a question such as "what is the temperature," etc. by processing the digital audio streams from the particular lighting fixtures that transmitted the digital audio streams. The central processing device 132 may also determine and/or estimate the location of the person 126 that uttered the voice command 128 based on the location and/or the time of arrival information at each lighting fixture that transmitted a respective digital audio stream of the recorded voice command 128. The central processing device 132 may also determine and/or estimate the location of the person 126 that uttered the voice command 128 based on the decibel level or another audio characteristic of the received voice command. In some example embodiments, the central processing device 132 may be able to identify the voice of the person 126 uttering the voice command 128, for example, by comparing characteristics of the voice (as conveyed by the digital audio streams) against stored information, such a stored voice signatures.

In some example embodiments, the central processing device 132 may take action in response to identifying a particular sound or voice command. For example, the central processing device 132 may control one or more lighting fixtures (e.g., a lighting fixture 102), sound an alarm (e.g., through the speaker of one or more of the lighting fixtures or other speakers), notify a person (e.g., via email or text message), and/or record information such as relevant coordinates, identification, duration, etc. based on identifying a particular sound. In some example embodiments, the central processing device 132 may take actions specific to an individual, such as the person 126, after recognizing the voice as that of the person 126.

In some example embodiments, only one of the lighting fixtures 102-110 or a subset of the light fixtures may transmit a digital audio stream to the central processing device 132. The central processing device 132 may use the received stream to identify the particular sound (e.g., a footsteps, breaking glass, etc.) or voice command and to determine or estimate the location of the source of the sound. For example, if the lighting fixture 102 transmits the digital audio stream, the absence of digital audio streams from the lighting fixtures 104-110 may be indicate that the source of the sound is relatively close to the lighting fixture 102.

In some example embodiments, the lighting fixtures 102-110 process a received sound/voice to determine whether the sound/voice should be transmitted to the central processing device 132. For example, each lighting fixture 102-110 may compare the amplitude of a received sound against a threshold amplitude to determine whether to record and/or transmit the sound as digital audio stream to the central processing device 132. To illustrate, one or more of the lighting fixtures 102-110 may not record a sound that does not have an amplitude exceeding and/or meeting a threshold when the sound is received at the particular lighting fixtures. For example, the lighting fixture 102 may determine that the sound 122 as received at the lighting fixture 102 exceeds a threshold amplitude, and the lighting fixture 106 may determine that the sound 122 as received at the lighting fixture 106 does not meet the threshold amplitude and may not record and/or transmit a digital audio stream of the sound 122.

By processing and transmitting sounds/voices received at multiple lighting fixtures, more reliable identification of sounds including voice commands may be achieved as compared to using a standalone device. By relying on the location information of multiple lighting fixtures and on the times of arrival of a sound/voice at the multiple lighting fixtures or amplitude or other audio characteristic of the sound/voice, the location of the source of the sound may be reliably determined or estimated. For example, triangulation of the sound source may be reliably performed by the central processing device 132.

In some example embodiments, the digital audio format transmitted by each lighting fixture 102-110 may be a compressed format. For example, the central processing device 132 may perform decompression of the digital audio stream before performing further processing. In general, a sound received by each lighting fixture 102-110 may be recorded by the particular lighting fixture in any format that can be transmitted to and processed by the central processing device 132. In general, the sound received by each lighting fixture 102-110 may be transmitted in any format that can be received and processed by the central processing device 132. For example, the recording of the sound may be performed for the purpose of transmitting the sound in a desired format along with timestamp information. In general, the time delay between receiving and transmitting the sound by each lighting fixture may be limited to the time needed to process the received sound.

In some example embodiments, references to sounds herein are applicable to voice without departing from the scope of this disclosure. In some alternative embodiments, the system 100 may include more or fewer lighting fixtures than shown without departing from the scope of this disclosure. In some example embodiments, the sounds received by one or more of the lighting fixtures 102-110 may be generated within or outside of the room 130 and may be sounds other than a breaking-glass sound, voice commands, etc. discussed above. Although the lighting fixtures 102-110 are shown as being in the same room 130, in some alternative embodiments, one or more of the lighting fixtures 102-110 or other lighting fixtures that are part of the system 100 may be in another room of the same building such as the same house. In some example embodiments, the lighting fixtures 102-110 may transmit digital audio streams generated from sounds received at the lighting fixtures without recording the digital audio streams.

Figure 2:
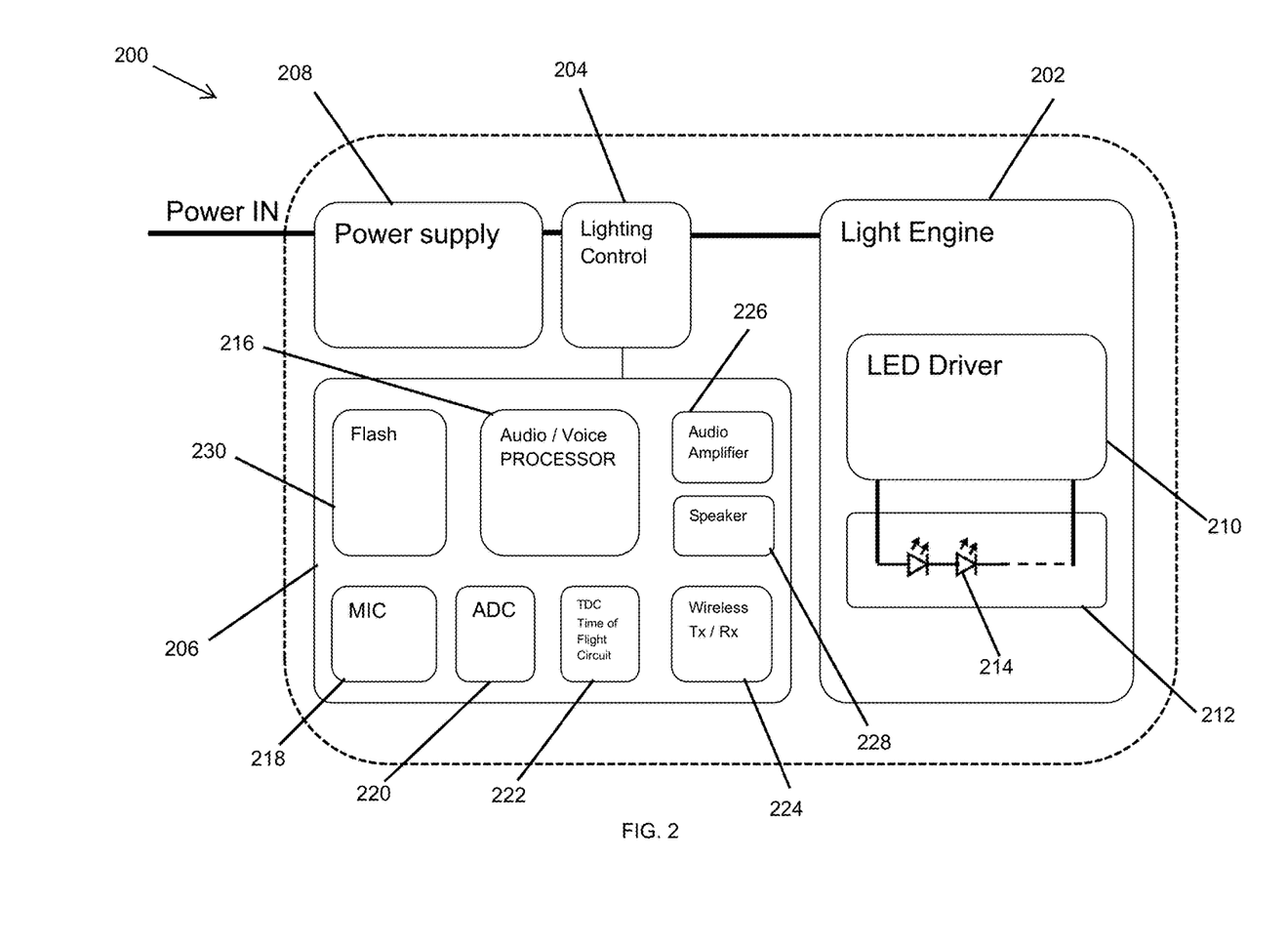
FIG. 2 illustrates a lighting fixture with integrated audio processing capabilities according to an example embodiment.

FIG. 2 illustrates a lighting fixture 200 with integrated audio processing capabilities according to an example embodiment. In some example embodiments, the lighting fixture 200 may correspond to each lighting fixture of the system 100 of FIG. 1. In some example embodiments, the lighting fixture 200 includes a light engine 202 that includes a driver 210 (e.g., an LED driver) and a light source 212 that may include one or more LEDs 214. The lighting fixture 200 may also include a lighting control circuit 204 that, for example, controls dimming, color temperature, etc. of the light provided by the lighting source 212 by controlling the driver 210 or a different control unit. The lighting fixture 200 may also include an audio operations unit 206 and a power supply 208. For example, the power supply 208 may receive AC power and generate one or more DC power signals. Alternatively, the power supply 208 may receive DC power and generate one or more DC power signals that may have different voltage levels from each other. In some example embodiments of the invention, the power supply may be combined with or may be part of the LED driver.

In some example embodiments, the audio operations unit 206 includes an audio processor 216, a microphone (or array of microphones) 218, and an analog-to-digital converter (ADC) 220 that converts the electrical signal from the microphone(s) 218 into a digital signal that may be processed by the audio processor 216. The lighting fixture 200 may also include a circuit 222 that associates time of arrival of a sound with the digital signal generated by the ADC 220. For example, the circuit 222 may timestamp the digital signal generated from the sound/voice received by the microphone when the amplitude of the sound/voice exceeds a threshold as determined, for example, based on the digital signal from the ADC 220. Alternatively, the circuit 222 may periodically timestamp the sound/voice received by the microphone before or after the sound/voice is converted to a digital signal and may associate the timestamp with the digital signal.

In some example embodiments, the processor 216 may process the digital signal from the ADC 220 along with the timestamp information and store both in the memory device 230 (e.g., a flash memory). The processor 216 may store the digital signal and the timestamp information in one of many possible formats. In some alternative embodiments, the processor 216 may not store the digital signal and other information. The processor 216 may also compress the digital signal along with the timestamp information and other information that may be available (e.g., a maximum amplitude of the received sound) before storing in the memory device 230. The processor 216 may provide the sound in digital form along with the timestamp information to the transceiver 224 (e.g., a radiofrequency transceiver) for transmission, for example, to a central processing device, such as the central processing device 132 of FIG. 1. For example, the processor 216 may provide the sound in digital form and the timestamp information to a transceiver 224 as a compressed or uncompressed digital audio stream. The processor 216 may execute software code and may use data stored in the memory device 230 or another memory device to perform its operations.

In some example embodiments, the audio operations unit 206 may also include an audio amplifier 226 and a speaker 228 that outputs a sound from an amplified electrical signal(s) provided by the amplifier 226. For example, the processor 216 may provide electrical signal(s) to the amplifier 226, and the amplifier 226 may amplify the electrical signal(s) and provide the amplified signal(s) to the speaker 228 that outputs a sound(s) corresponding to the electrical signal(s). For example, the processor 216 may use the speaker to generate a particular sound, such as an alarm sound, words, etc.

In some example embodiments, the processor 216 inverts the ambient noise received by the microphone 218 and uses the speaker 228 to output a sound that corresponds to the inverted ambient noise. The processor 216 alternatively or in addition uses the speaker 228 to emit a sound that can drown out the ambient noise in an area near the lighting fixture 200. For example, the processor 216 may generate a soothing sound (e.g., a wave sound, white noise, nature sounds, etc.) with enough amplitude to reduce the effect of ambient noise on a person that is near the lighting fixture 200. To illustrate, the processor 216 may process the digital signal generated by the ADC 220 from the ambient noise received by the microphone 218 to determine the amplitude and/or other characteristics of the ambient noise and may use the speaker 228 to output a sound to counteract the ambient noise. For example, one or more sounds may be stored in a memory device 230 or in another memory device of the audio operations unit 206, and the processor 216 may retrieve one of the stored sounds to output the sound through the speaker 228.

In some example embodiments, the processor 216 uses the speaker 228 to output a sound based on information received by the transceiver 224. For example, the transceiver 224 may receive information from the central processing device 132, for example, via the gateway device 124 wirelessly or via a wired connection. To illustrate, the information may include a sound that the lighting fixture 200 should output or may alternatively or in addition indicate a particular sound or characteristics of the sound that the lighting fixture 200 should output.

In some example embodiments, one or more lighting commands may be received by the transceiver 224 and may be provided, for example, through the processor 216 to the lighting control circuit 204 that can control the light engine accordingly. In some alternative embodiments, a separate transceiver may be used to receive lighting control commands and information. In some alternative embodiments, some components of the lighting fixture 200 may be integrated into a single component without departing from the scope of this disclosure. In some alternative embodiments, one or more components of the lighting fixture 200 may be omitted without departing from the scope of this disclosure. In some example embodiments, the lighting fixture 200 may include a transmitter and a receiver instead of the transceiver 124 that combine to operate as described above with respect to the transceiver 124.

Figure 3:
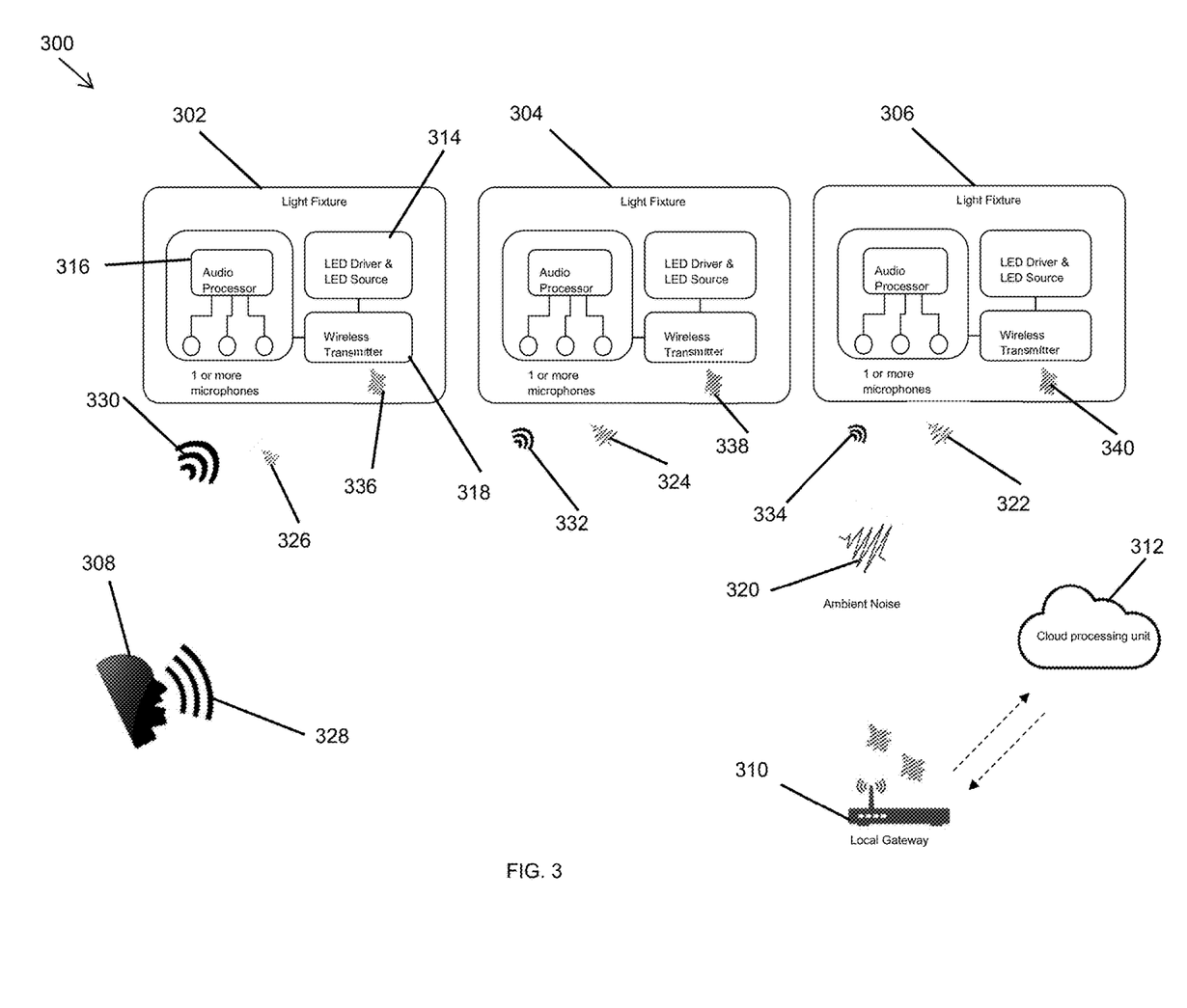
FIG. 3 illustrates a lighting and sound system including lighting devices that enable improved identification of sounds according to another example embodiment.

FIG. 3 illustrates a lighting and sound system 300 including lighting devices 302, 304, 306 that enable improved identification of sounds according to another example embodiment. In some example embodiments, the lighting devices 302, 304, 306 each correspond to the lighting fixture 200 of FIG. 2. The system 300 may include a local gateway device 310 that may correspond to the gateway device 124. The processing unit 312 may be a cloud server, a local server, a gateway device, an edge computing device(s), or another server such as a remotely located server. Alternatively, the processing unit 312 may comprise multiple, distributed processing units. For example, the processing unit 312 may correspond to the processing device 132 of FIG. 1.

In some example embodiments, each lighting fixture 302, 304, 306 may include one or more microphones and an audio processor unit 316 that processes the sounds/voice received by the one or more microphones, for example, in a similar manner as described with respect to the lighting fixture 200. For example, the audio processor unit 316 may record a received sound or a received voice command in a digital format along with a timestamp and may transmit the recorded sound and timestamp as a digital audio stream. Alternatively, the audio processor unit 316 may transmit the sound digitally along with the timestamp without first recording the sound. As described above, the timestamp may correspond to or may be indicative of the time of arrival of the sound/voice at the respective lighting fixture 302, 304, 306. A transceiver of each lighting fixture 302, 304, 306, such as the transceiver 318, may transmit a respective wireless signal 336, 338, 340, respectively, that may include a respective digital audio stream. In some alternative embodiments, the transceiver of each lighting fixture 302, 304, 306 may transmit a respective signal via a respective wired connection.

In some example embodiments, an ambient noise 320 may be present in the space near the lighting fixtures 302, 304, 306, and may be received by each lighting fixture 302, 304, 306, as an ambient noise 322, 324, 326, respectively. For example, because of the location of each lighting fixture 302, 304, 306 relative to the source of the ambient noise 320, the ambient noises 322, 324, 326, may have different amplitudes from each other and from the amplitude of the ambient noise 320. To illustrate, the ambient noise 326 may have a smaller amplitude than the ambient noise 324, 322, and the ambient noise 324 have a smaller amplitude than the ambient noise 322.

In some example embodiments, the respective digital audio stream transmitted by each lighting fixture 302, 304, 306 may be generated based on a voice 328 (e.g., a voice command, a word, a phrase, etc.) uttered by a person 308 and the respective ambient noise received by each lighting fixture 302, 304, 306. For example, the voice 328 may be received as voices 330, 332, 334 at the different lighting fixtures 302, 304, 306, respectively, at different times, for example, because of the different distances of the lighting fixtures 302, 304, 306 from the person 308.

The processing unit 312 may receive a digital audio stream from each lighting fixture 302, 304, 306 and process each digital audio stream, for example, to decompress, extract the timestamp information, etc. With respect to each digital audio stream, the processing unit 312 may filter out ambient noise from the audio stream, for example, based on one or more of a frequency bandwidth filter, a white noise filter, a filter designed to filter out a common and/or expected noise (e.g., a filter designed to remove noise resulting from highway traffic, pedestrian traffic, conversations, or construction), etc.

In some example embodiments, the processing unit 312 may examine each filtered stream (i.e., after the noise filtering) to identify/determine the audio content. For example, the processing unit 312 may identify/determine the audio content of each stream as the particular voice command 328, for example, by comparing the audio content against known sounds and voice commands. In some example embodiments, the audio content may be another voice command, a breaking-glass sound, a doorbell, a smoke alarm, footsteps, baby-crying sound, etc., and the processing unit 312 may identify/determine the audio content as such, for example, by comparing the audio content of the filtered audio stream against known sounds and voice commands that may be, for example, stored at the processing unit 312.

In some example embodiments, the processing unit 312 may perform, additionally or alternatively, filtering of the digital audio streams before identifying/determining the audio content of the digital audio streams. For example, the processing unit 312 may subtract or otherwise filter the audio contents of the different streams from each other to produce improved quality of the audio content. To illustrate, in some cases, the audio content of the digital audio stream from the lighting fixture 306 may include mostly the ambient noise 324. In such cases, subtracting or filtering the audio content of the digital audio stream transmitted by the lighting fixture 306 from the audio contents of the digital audio streams transmitted by the lighting fixtures 302, 304 may result in improved quality audio contents that can be used to more reliably identify/determine the audio contents from the lighting fixtures 302, 304 as the particular voice command 328 or as another voice command or sound. The processing unit 312 may use the audio contents of some of the audio streams and may not use the audio contents of one or more other audio streams in performing the additional filtering of the audio contents.

In some example embodiments, the processing unit 312 may compare the timestamps (or amplitude or other characteristic of the captured audio stream) associated with audio contents that correspond to the same sound or voice command and determine/estimate the location of the source of the sound or the voice command based on the locations of the particular lighting fixtures. For example, if the audio contents of digital audio stream from the two or more of the lighting fixtures 302, 304, 306 correspond to the particular voice command 328, the processing unit 312 may determine, by comparing the timestamps, that the person 308 is at a location that is close to the lighting fixture 302 based on the shortest flight time of the voice command 328 to reach the lighting fixture 302 as compared to the flight times to reach the lighting fixtures 304, 306.

After identifying the particular voice command or sound and in some cases the location of the source of a sound or voice command, the processing unit 312 may take appropriate action such as controlling one or more light fixtures (e.g., lighting fixtures that are in the same room as the person 308 based on the determination of the location of the person 308 as described above), notifying of the recording of the audio characteristics (e.g., local coordinates, identification, duration, etc.), notifying a user that a particular window broke (e.g., window in kitchen), etc. By filtering the audio content(s) of one or more of the digital audio streams transmitted by the lighting fixtures 302, 304, 306, as described above, the improved audio content(s) may be used to more reliably recognize a particular person's voice and appropriate actions associated with the person may be taken by the processing unit 312.

In some example embodiments, the processing unit 312 may receive a voice command through one of the lighting fixture 302, 304, 306, and take action through other one or more of the lighting fixture 302, 304, 306 or other one or more lighting fixtures of the system 300. For example, the lighting fixture 302 may be in a first room of a house, and the lighting fixture 304 may be in a second room of the house. The processing unit 312 may process a voice command received through the lighting fixture 302 and may provide a response or otherwise take an action through the lighting fixture 304. For example, the processing unit 312 may control the lighting fixture 304 to generate an audio response through the speaker of the lighting fixture 304. As another example, the processing unit 312 may control whether the lighting fixture 304 emits a light.

In some example embodiments, the processing unit 312 may take an action at the lighting fixture 304 in response to the voice command received through the lighting fixture 302. The voice command may explicitly or implicitly indicate that the response/action should occur through the lighting fixture 304 by identifying the lighting fixture 304, a room in which the lighting fixture 304 is located, etc. For example, the voice command may indicate that the light in a particular room, where the lighting fixture 304 is located, should be turned on. As another example, the voice command may indicate that a hallway light should be turned on, and the processing unit 312 may control the lighting fixture 306 to emit a light if the lighting fixture 306 is installed in the hallway. In some example embodiments, the processing unit 312 may control whether the lighting fixture 304 emits a light in response to the voice command received through the lighting fixture 302 and/or a detection of a motion, for example, near the lighting fixture 304.

In some example embodiments, the processing unit 312 may take an action at the lighting fixture 304 in response to the voice command received through the lighting fixture 302 and upon detection of the person 308 and/or another person in same room as the lighting fixture 304. For example, the person 308 may move to the room that has the lighting fixture 304 after uttering a voice command in the room that has the lighting fixture 302. Upon detection of the person 308 in the room that has the lighting fixture 304, the processing unit 312 may take or cause an action (e.g., blink a light, audio response, display or project information, etc.) at the lighting fixture 304 or another device (e.g., a mobile device, a speaker device, a display device, another sound-enabled device, etc.) in the room in communication with, directly or indirectly, the processing unit 312.

As a non-limiting example, when the person 308 in a room (e.g., a bedroom) that has the lighting fixture 302 asks a question such as "what are the traffic conditions on the way to work" and walks out of the room toward a door (e.g., a front door of the house), the processing unit 312 may provide the response to the person's request through the speaker of the lighting fixture 304 or another lighting fixture or other sound-enabled device of the system 300 that detects the presence of the person. For example, the lighting fixture 304 or another lighting fixture or sound-enabled device may be installed near the door of the house. A lighting fixture integrated or a standalone motion sensor may detect the motion of the person and provide the information to the processing unit 312. Alternatively, the processing unit 312 may have information about the location of different lighting fixtures or other sound-enabled devices of the system 300 and provide the response based on the particular question and the expected location of the person 308 after asking the question, for example, based on the motion characteristics detected by the motion sensor(s).

As another non-limiting example, the person 308 may be in a room that has the lighting fixture 306 and may utter a voice command, "Tell me when the baby wakes up." Upon determining that a sound received through the microphones of the lighting fixture 306 is a baby-crying sound and based on detection of the person 308 in a different room that has, for example, the lighting fixture 302 or another device (e.g., a mobile device, a speaker device, a display device, another sound-enabled device, etc.) that may be in communication (through the lighting fixtures or separately) with the processing unit 312, the processing unit 312 may provide a notification of the baby waking up through the lighting fixture 302 or via the other device. For example, the processing unit 312 may provide an audio notification through the speaker of the lighting fixture 302, a visual notification by flashing the light emitted by the lighting fixture 302, changing the color of the light emitted by the lighting fixture 302, etc. As another example, the processing unit 312 may provide an audio notification, a visual notification, and/or another notification through another device such as a mobile device, a speaker device, a display device, another sound-enabled device, etc. In some alternative embodiments, the detection of the baby waking up and/or the presence of the person 308 in a different room may be based on motion detection by a motion sensor, a camera, Wi-Fi fingerprint, voice detection, or another detection means incorporated in the light fixture 306 or 302, as may be contemplated by those of ordinary skill in the art with the benefit of this disclosure.

In general, alternatively or in addition to providing a response or otherwise taking action through one or more of the lighting fixtures of the system 300, the processing unit 312 may send response/notification to a smart phone device, an application associated with the system, or a sound-enabled device of or associated with the system.

The detection of the person 308 in a particular room or area may be based on a motion sensor, a camera, a Wi-Fi fingerprint, a smart phone detection, voice detection, etc.

The person 308 may also be assumed to be in a particular room or area based on the particular voice command. Information indicating the presence of the person 308 in a particular room may be provided to the processing unit 312, for example, via the respective one of the wireless signals 336, 338, 340.

In some alternative embodiments, the system 300 may include more or fewer lighting fixtures than shown without departing from the scope of this disclosure. In some alternative embodiments, the lighting fixtures of the system 300 may be different types of lighting fixtures from each other (e.g., downlights, troffers, suspended luminaires, table or floor lamps, light bulbs, etc.). In some embodiments, other sound-enabled devices connected to system 300 and containing microphones, speakers, indicator lights, displays, etc. may be utilized in the system 300 to respond to voice commands received at other remotely located light fixtures or other remotely located sound-enabled devices in the system 300.

Figure 4:
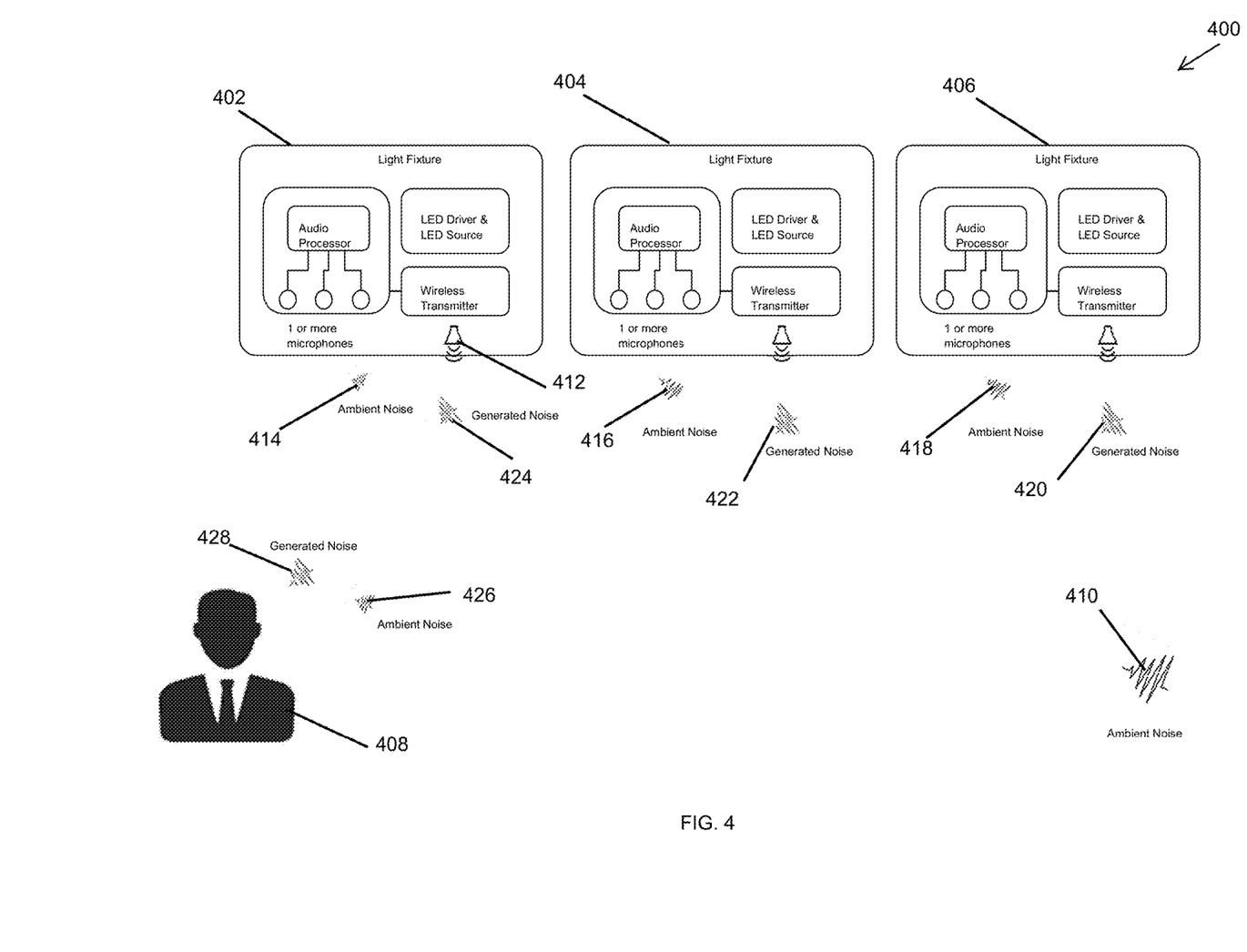
FIG. 4 illustrates a lighting and sound system including lighting fixtures that enable noise reduction in an area according to an example embodiment.

FIG. 4 illustrates a lighting and sound system 400 including lighting fixtures 402, 404, 406 that enable noise reduction in an area according to an example embodiment. In some example embodiments, the lighting fixtures 402, 404, 406 each correspond to the lighting fixture 200 of FIG. 2. In some example embodiments, the lighting fixtures 402, 404, 406 correspond to the lighting fixtures 302, 304, 306, respectively, of FIG. 3. In some example embodiments, an ambient noise 410 may be received at the lighting fixtures 402, 404, 406 with different characteristics (e.g., amplitudes) as ambient noise 414, 416, 418, respectively. For example, the ambient noises 414, 416, 418 may have different amplitudes from each other because of the differences in the distances of the lighting fixtures 402, 404, 406 from a source of the ambient noise 410.

In some example embodiments, the lighting fixture 402 may receive the ambient noise 414 and invert the ambient noise 414 generating a generated noise 424 that is an inversion of the ambient noise 414. For example, the speaker 412 may output the generated noise 424. The lighting fixture 404 may receive the ambient noise 416 and invert the ambient noise 416 generating a generated noise 422 that is an inversion of the ambient noise 416 in a similar manner. The lighting fixture 406 may receive the ambient noise 418 and invert the ambient noise 418 generating a generated noise 420 that is an inversion of the ambient noise 418.

In some example embodiments, the ambient noise 410 at a location close to the person 408 may be represented by an ambient noise 426, and the generated noises 420, 422, 424 may be combined in the air to produce a generated noise 428 at a location that is close to the person 408. Because the generated noise 428 is a combination of the generated noises 420, 422, 424, which are inversions of the ambient noises 414, 416, 418, respectively, related to the ambient noise 410, the combination of the generated noise 428 and the ambient noise 426 may result in the person 408 hearing a reduced ambient noise. As the ambient noise 410 changes in amplitude or other characteristics, the generated noises 420, 422, 424 may responsively change to counteract the effect of the ambient noise 410.

In some alternative embodiments, the system 400 may include more or fewer lighting fixtures than shown without departing from the scope of this disclosure. The system 400 may operate as described above or in a similar manner with more or fewer lighting fixtures to reduce the effects of ambient noise. In some example embodiments, one of the light fixtures 402, 404, 406 may be in a different room from the remaining two of the lighting fixtures 402, 404, 406.

Figure 5:
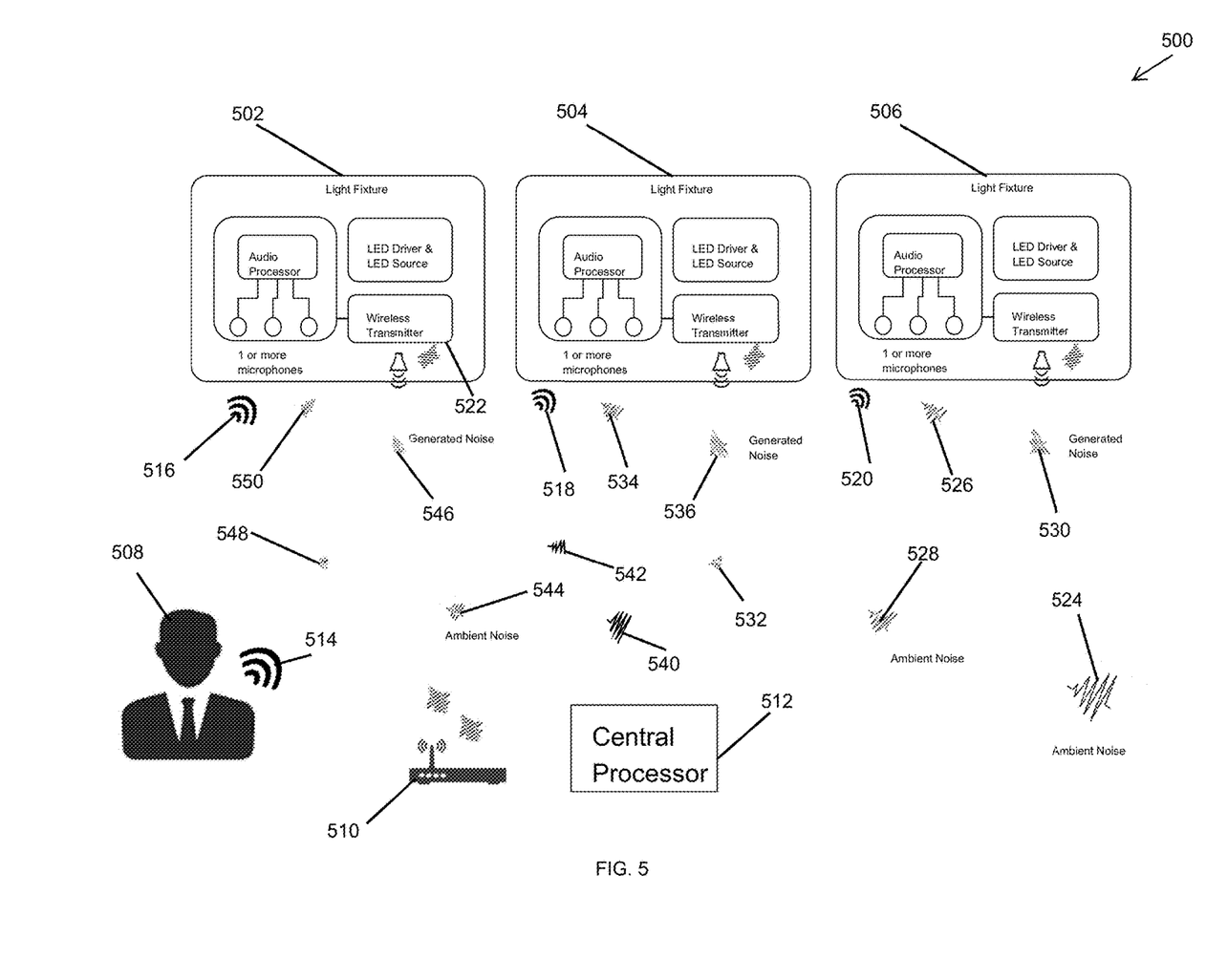
FIG. 5 illustrates a lighting and sound system including lighting devices according to another example embodiment.

FIG. 5 illustrates a lighting and sound system 500 including lighting devices 502, 504, 506 according to another example embodiment. In some example embodiments, the lighting fixtures 502, 504, 506 each correspond to the lighting fixture 200 of FIG. 2. In some example embodiments, the lighting fixtures 502, 504, 506 correspond to the lighting fixtures 302, 304, 306, respectively, of FIG. 3 or the lighting fixtures 402, 404, 406, respectively, of FIG. 4. In some example embodiments, the system 500 may include a local gateway device 510 that may correspond to the gateway device 124 or the gateway device 310. The system 500 may also include a processing unit 512 that may be a cloud server, a local server, an edge computing device(s), or another server such as a remotely located server. For example, the processing unit 512 may correspond to the processing device 132 of FIG. 1 or the processing unit 312 of FIG. 3.

In some example embodiments, an ambient noise 524 may be received at the lighting fixtures 502, 504, 506 with different characteristics (e.g., different amplitudes) as an ambient noise 550, 534, 526, respectively. For example, the ambient noises 526, 534, 550 may have different amplitudes from each other because of the differences in the distances of the lighting fixtures 502, 504, 506 from a source of the ambient noise 524.

In some example embodiments, a person 508 may utter a voice command 514. For example, when the person 508 utters "cancel noise" or a similar word/command as the voice command 514, the voice command 514 may be received at the lighting fixtures 502, 504, 506 as voices commands 516, 518, 520, respectively, at different times because of the differences in the distances between the person 508 and the lighting fixtures 502, 504, 506. Each lighting fixture 502, 504, 506 may process the voice commands 516, 518, 520 as described above and may transmit a respective digital audio stream that includes or that is associated with respective timestamp information. The processing unit 512 may process the digital audio streams as described above and may determine the audio content is or includes "cancel noise" or the particular word/command uttered as the voice command 514.

In some example embodiments, in response to identifying the audio content of one or more of the digital audio streams as the voice command 514 requesting noise cancellation or corresponding to a noise cancellation request, the processing unit 512 may send a command to the light fixtures 502, 504, 506 to output a respected generated noise 530, 536, 546. The speaker 522 may output the generated noise 546, and the speakers of the lighting fixture 504, 506 similarly output the generated noises 530, 536.

In some example embodiments, each generated noise 530, 536, 546 may be an inverted version of the ambient noise 526, 534, 550 received by the lighting fixtures 506, 504, 502, respectively. For example, each lighting fixture 502, 504, 506 may invert the respective ambient noise 526, 534, 550 and output the generated noise 530, 536, 546, respectively. Alternatively, the processing unit 512 may invert the ambient noises 526, 534, 550 based on digital audio streams received by the processing unit 512 from the light fixtures 502, 504, 506 and send digital audio streams of the inverted noises to the light fixtures 502, 504, 506. The light fixtures 502, 504, 506 may receive the digital audio streams of the inverted noises and output the generated noises 530, 536, 546. As the ambient noises 526, 534, 550 change in amplitude (e.g., increase or decrease) and/or other characteristics, the generated noises 530, 536, 546 may responsively change to counteract the effect of the ambient noises 524 on the person 508.

As another example, one or more of the generated noises 530, 536, 546 may be a white noise or another type of noise instead of the inversion(s) of one or more of the ambient noises 526, 534, 550. For example, waveforms of a white noise and other types of noise may be stored in a memory device at each lighting fixture 502, 504, 506, and the lighting fixtures 502, 504, 506 may output the generated noises 530, 536, 546 based on the stored waveforms in response to receiving a command from the processing unit 512 to output the generated noises 530, 536, 546. The amplitude of each of the generated noises 530, 536, 546 may depend on the amplitude of the respective ambient noises 526, 534, 550 and may be different from each other.

In some example embodiments, the generated noise 530 may combine with an ambient noise 528, which corresponds to the ambient noise 524 at a location of the ambient noise 528, resulting in a reduced ambient noise 532. For example, the ambient noise 526 may closely resemble the ambient noise 528 because of the locations of the noises at or near the lighting fixture 506. The generated noise 536 may combine with an ambient noise 540, which corresponds to the ambient noise 524 at a location of the ambient noise 540, resulting in a reduced ambient noise 542. For example, the ambient noise 534 may closely resemble the ambient noise 540 because of the locations of the noises at or near the lighting fixture 504. The generated noise 546 may combine with an ambient noise 544, which corresponds to the ambient noise 524 at a location of the ambient noise 544, resulting in a reduced ambient noise 548. For example, the ambient noise 550 may closely resemble the ambient noise 544 because of the locations of the noises at or near the lighting fixture 502. The reduced ambient noise 548 close to the person 508 may result in a less noisy environment for the person 508. For example, the reduced ambient noise 548 may provide a less noisy environment that allows the person 508, for example, to engage in a conversation with another person in the room, in another room, or over a telephone, to listen to music, or to allow for a clearer verbal command to be received at one or more light fixtures or other sound-enabled devices.

In some example embodiments, the processing unit 512 may estimate the location of the person 508 based on the timestamp information provided by each lighting fixture 502, 504, 506 with respect to the voice commands 516, 518, 520 and based on the location of the lighting fixtures 502, 504, 506. The processing unit 512 may then send a command to the light fixtures 502, 504, 506 to generate the respected generated noise 530, 536, 546, based on the ambient noise at the estimated location of the person 508. For example, the processing unit 512 may consider the effect of each generated noise 530, 536, 546 on the ambient noise 524 along the path to the person 508 when providing the command to the light fixtures 502, 504, 506 to output the generated noises 530, 536, 546. In some example embodiments, the processing unit 512 controls the lighting fixtures 502, 504, 506 to iteratively adjust the generated noises 530, 536, 546 such that the reduced ambient noise 548 is reduced enough such that the reduced ambient noise 548 does not interfere with conversations, etc. at the location of the person 508. For example, the processing unit 512 may iteratively adjust the generated noises 530, 536, 546 based on a user input indicating whether the reduced ambient noise 548 adequately reduced. In some alternative embodiments, the processing unit 512 may iteratively adjust the generated noises 530, 536, 546 by evaluating a digital audio stream of the ambient noise 550 received from the lighting fixture 502. Because the lighting fixture 502 is relatively close to the person 508, the ambient noise 550 may provide a reasonable indication of the reduced ambient noise 548.

In some alternative embodiments, the system 500 may include more or fewer lighting fixtures than shown without departing from the scope of this disclosure. The system 500 may operate as described above or in a similar manner with more or fewer lighting fixtures to reduce the effects of ambient noise. In some example embodiments, one of the light fixtures 502, 504, 506 may be in a different room from the remaining two of the lighting fixtures 502, 504, 506.

Figure 6:
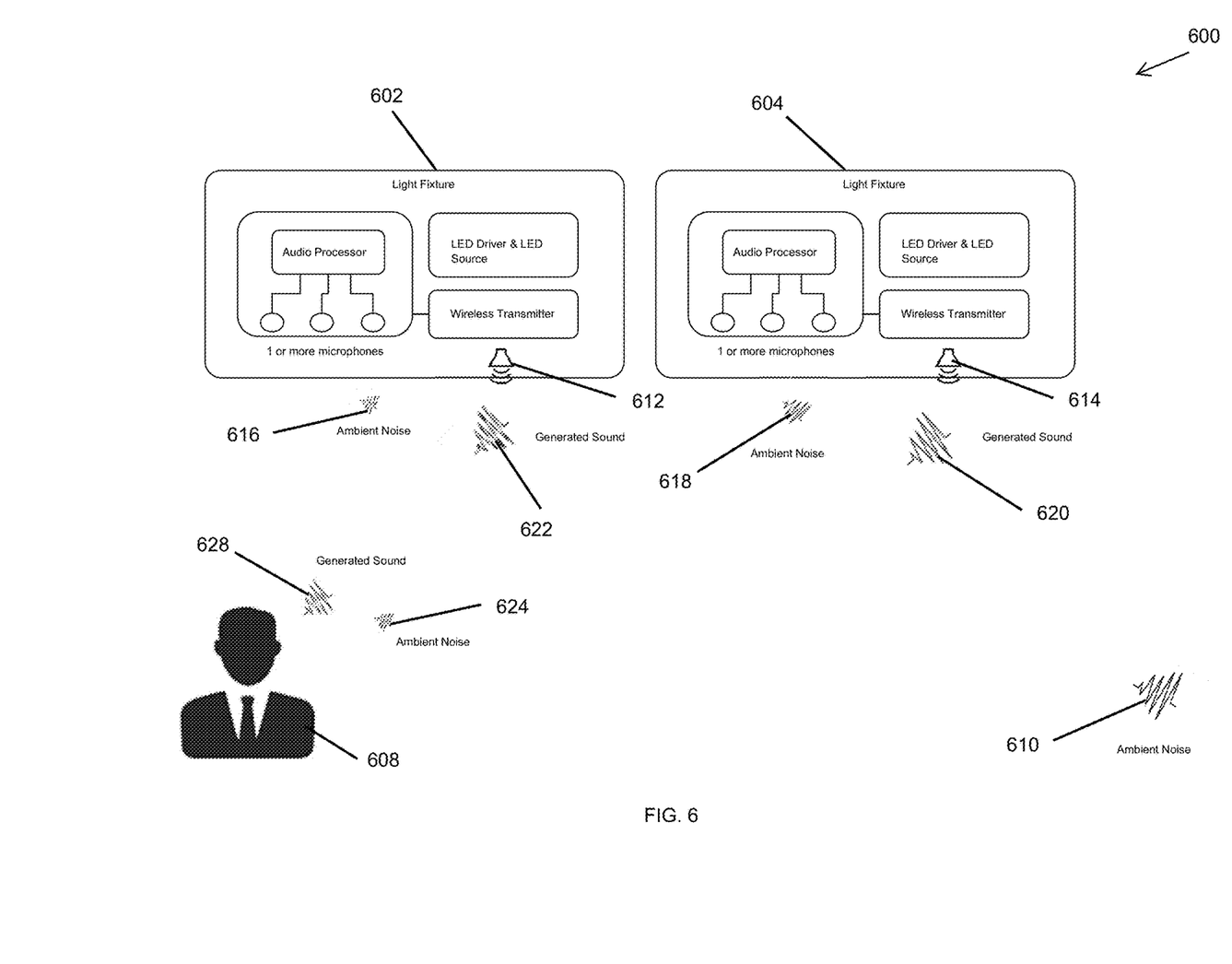
FIG. 6 illustrates a lighting and sound system including lighting devices that enable reducing effects of ambient noise according to an example embodiment.

FIG. 6 illustrates a lighting and sound system 600 including lighting devices 602, 604 that enable reducing effects of ambient noise according to an example embodiment. In some example embodiments, the lighting fixtures 602, 604 each correspond to the lighting fixture 200 of FIG. 2. In some example embodiments, the lighting fixtures 602, 604 correspond to two of the lighting fixtures 302, 304, 306, respectively, of FIG. 3, two of the lighting fixtures 402, 404, 406, respectively, of FIG. 4, or two of the lighting fixtures 502, 504, 506 of FIG. 5.

In some example embodiments, an ambient noise 610 may be received at the lighting fixtures 602, 604 as an ambient noise 616, 618, respectively. For example, the ambient noises 616, 618 may have different amplitudes from each other and from the ambient noise 610 because of the differences in the distances of the lighting fixtures 616, 618 from a source of the ambient noise 610.

In some example embodiments, the lighting fixture 602 may receive the ambient noise 616 and generate a generated sound 622. For example, a speaker 612 of the lighting fixture 602 may output the generated sound 622. To illustrate, the lighting fixture 602 may determine the maximum amplitude of the ambient noise 616 and output the generated sound 622 that reduces the effect of an ambient noise 624 on the person 608. For example, the ambient noise 624 may be the ambient noise 610 at a location near the person 624, and a generated sound 628 may be the generated sound 622 at a location near the person 624. The generated sound 622 may be a soothing sound or another sound that may drown out or reduce the effect of the ambient noise 610 at the location near the person 624. For example, the generated sound 622 may be stored in a digital audio format in a memory device (e.g., the flash memory 230 shown in FIG. 2) of the lighting fixture 602. To illustrate, one or more sounds may be stored in the memory device of the lighting fixture 602, and the lighting fixture 602 may select one of the stored sounds to output as the generated sound 622.

In some example embodiments, the lighting fixture 604 may output a generated sound 620 in a similar manner as the lighting fixture 602 outputs the generated sound 622. For example, the lighting fixture 604 may determine the maximum amplitude of the ambient noise 618 and output the generated sound 620 to reduce the effect of the ambient noise 610 at a location near the lighting fixture 604.

In some alternative embodiments, the system 600 may include more or fewer lighting fixtures than shown without departing from the scope of this disclosure. In some example embodiments, one or more of the light fixtures of the system 600 may be in a different room from the remaining the lighting fixtures of the system 600.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting system, comprising:
a first lighting fixture comprising a first microphone, a first transmitter, a first light source to emit a first illumination light, and a first lighting driver to provide a first power to the first light source, wherein the first transmitter is configured to transmit a first digital audio stream generated at least based on a sound;
a second lighting fixture comprising a second microphone, a second transmitter, a second light source to emit a second illumination light, and a second lighting driver to provide a second power to the second light source, wherein the second transmitter is configured to transmit a second digital audio stream generated at least based on the sound and wherein the sound is received by the first microphone and by the second microphone; and
a central processor that is external to the first lighting fixture and the second lighting fixture, wherein the central processor is configured to process the first digital audio stream and the second digital audio stream to identify the sound and wherein the central processor is configured to subtract the first digital audio stream from the second digital audio stream during the processing of the first digital audio stream and the second digital audio stream to identify the sound.

2. The lighting system of claim 1, wherein the first lighting fixture is configured to send first timestamp information in or associated with the first digital audio stream, wherein the first timestamp information indicates a first time arrival of the sound at the first lighting fixture, wherein the second lighting fixture is configured to send second timestamp information in or associated with the second digital audio stream, and wherein the second timestamp information indicates a second time arrival of the sound at the second lighting fixture.

3. The lighting system of claim 2, wherein the central processor is configured to estimate a location of a source of the sound based on the first timestamp information and the second timestamp information.

4. The lighting system of claim 1, wherein the central processor is configured to identify whether the sound is a particular voice command, a breaking-glass sound, a sound of footsteps, a fire alarm sound, or a smoke alarm sound.

5. The lighting system of claim 1, wherein the first lighting fixture includes a speaker and wherein the speaker is configured to output an output sound based on information received from the central processor in response to identifying the sound.

6. The lighting system of claim 5, wherein the first lighting fixture is located in an area and wherein the central processor sends the information to the first lighting fixture in response to a detection of a person in the area.

7. The lighting system of claim 1, wherein the first light source is configured to provide a visual notification based on information received from the central processor in response to identifying the sound.

8. A method of sound-based operation of a lighting system, the method comprising:

providing multiple lighting fixtures;
receiving, by the multiple lighting fixtures, a sound;
transmitting, by at least two lighting fixtures of the multiple lighting fixtures, digital audio streams that each contain an audio content corresponding to the sound, wherein each lighting fixture of the at least two lighting fixtures comprises a microphone, a transmitter, a light source to emit an illumination light, and a lighting driver to provide a power to the light source; and
identifying, by a central processor that is external to the multiple lighting fixtures, the sound by subtracting a first digital audio stream of the digital audio streams from a second digital audio stream of the digital audio streams.

9. The method of claim 8, wherein each digital audio stream of the digital audio streams contains timestamp information corresponding to or indicative of a time at which the sound is received at the lighting fixture transmitting the particular digital audio stream.

10. The method of claim 9, further comprising determining or estimating, by the central processor, a location of a source of the sound.

11. The method of claim 10, wherein determining or estimating the location of the source of the sound is performed based on the timestamp information.

12. The method of claim 8, further comprising controlling a light emitted by one or more of the multiple lighting fixtures in response to identifying the sound.

13. The method of claim 8, wherein identifying the sound includes identifying the sound as a breaking-glass sound, a sound of footsteps, a fire alarm sound, or a smoke alarm sound.

14. The method of claim 8, wherein identifying the sound includes identifying the sound as a particular voice command.

15. The method of claim 8, wherein each lighting fixture of the multiple lighting fixtures transmits a digital audio stream in response to determining that an amplitude of the sound at the particular lighting fixture exceeds a threshold.

16. A method of sound processing in a lighting system, the method comprising:

providing a first lighting fixture and a second lighting fixture;
receiving, by the first lighting fixture, a voice command;
receiving, by the second lighting fixture, the voice command;
transmitting, by the first lighting fixture, a first digital audio stream that contains a first audio content corresponding to the voice command;
transmitting, by the second lighting fixture, a second digital audio stream that contains a second audio content corresponding to the voice command;
identifying, by a central processor, the voice command by subtracting the first digital audio stream from the second digital audio stream; and
transmitting, by the central processor, to the second lighting fixture a response to the voice command, wherein the central processor is external to the first lighting fixture and the second lighting fixture, wherein the second lighting fixture comprises a motion sensor and wherein the central processor transmits the response to the voice command to the second lighting fixture in response to a motion detection by the motion sensor.

17. The method of claim 16, wherein the central processor transmits the response to the voice command to the second lighting fixture in response to a detection of a person near the second lighting fixture.

18. The method of claim 16, wherein the central processor transmits the response to the voice command to the second lighting fixture in response to the voice command referring to the second lighting fixture.

* * * * *